May 20, 1958  J. L. LINDESMITH  2,835,868
VOLTAGE TO DIGITAL MEASURING CIRCUIT
Filed Sept. 16, 1952
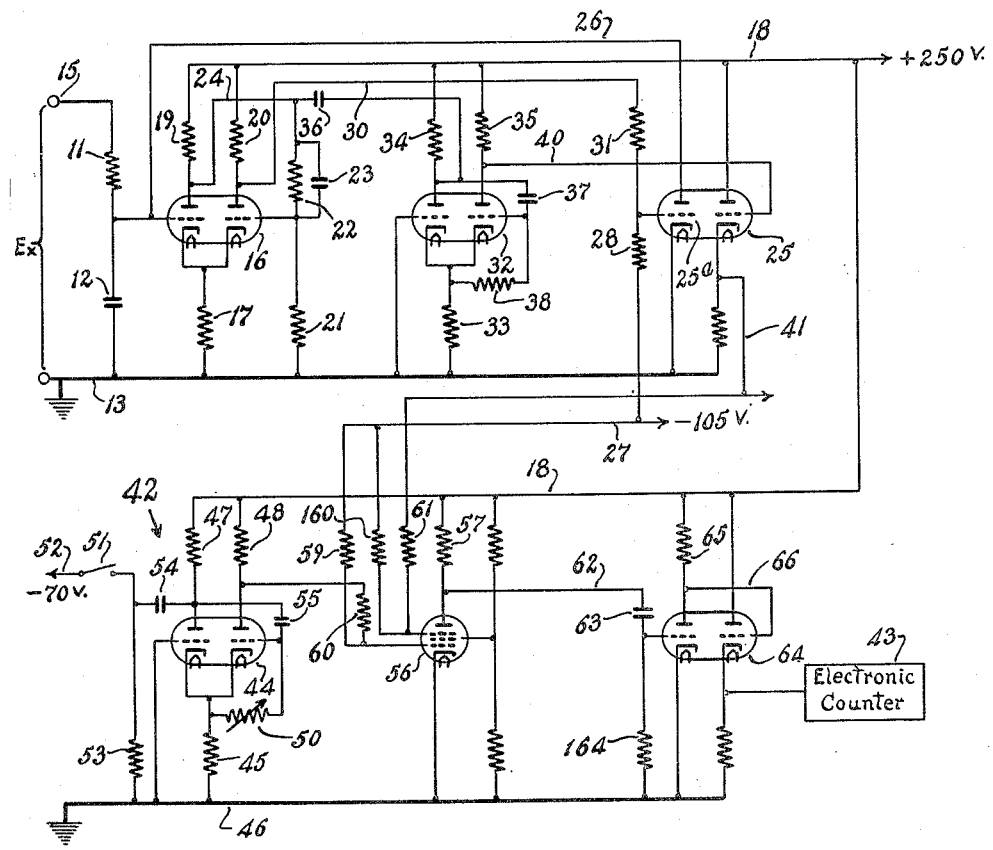
INVENTOR,
John L. Lindesmith
BY
ATTORNEY.

United States Patent Office 2,835,868
Patented May 20, 1958

2,835,868

VOLTAGE TO DIGITAL MEASURING CIRCUIT

John L. Lindesmith, Sierra Madre, Calif., assignor to Clary Corporation, a corporation of California Application September 16, 1952, Serial No. 309,783

2 Claims. (Cl. 324—111)

This invention relates to a system for converting analogue representations to digital representations, or, in other words, a system for converting physically measurable quantities into equivalent discrete digital values. More specifically, the invention relates to an electrical system for converting variable voltages of unknown values into digital information indicative of the value of such voltages.

Meters, and the like, operating on an analogue principle and comprising, for example, a pointer movable over a calibrated scale, are well known for measuring variable quantities, such as pressure, rate of flow, temperature, weight, etc. Although such analogue devices are generally satisfactory, they require a particular amount of skill in order to read the same with any degree of accuracy and speed. Also, because of the necessity of interpolating values of lower denomination, the higher the degree of precision required, the less likely would be the probability of two different observers reading identical values from the same scale.

It therefore becomes a principal object of the present invention to provide an electrical system for registering in digital form amounts representing variable electrical quantities.

Another object is to provide an electrical analogue-to-digital converter system having a relatively high degree of accuracy over a relatively wide range of values.

A further object is to provide a relatively simple system for accomplishing the above-noted purpose.

The manner in which the above and other objects of the invention are accomplished will be readily understood on reference to the following specification when read in conjunction with the accompanying drawing wherein the figure illustrates a preferred embodiment of the invention.

The invention is based on the fact that although a condenser in a time constant circuit is known to charge according to an exponential rate, a portion of the exponential curve approaches a straight line. By utilizing such approximately straight line portion only as a controlling factor in an oscillator circuit, a variable frequency relaxation oscillator results, having a relatively highly accurate response. By applying the voltage to be measured to a time constant circuit which is preferably an RC circuit, and by connecting the output of the oscillator to an accurately timed gating circuit, the system will transmit a number of pulses proportional to the voltage being measured during the interval in which the gating circuit is open. An electronic counter connected to the output of the gating circuit will then indicate in digital form the value of the voltage being measured.

An electronic switch is provided to discharge the condenser of the RC circuit when the latter has received a charge of a potential which is relatively small in comparison to the total voltage being applied so as to operate within the straight line portion of the voltage charging curve of the condenser. The electronic switch permits the immediate recharging of the condenser upon completion of its charging action to form in effect a saw tooth oscillator.

Referring to the drawing, the system comprises a time constant circuit of the RC type including a 1 megohm resistor 11 and a .01 mfd. condenser 12 connected in series with each other. The lower or low potential end of the condenser is connected to a ground line 13 while the upper end of the resistor ends in a terminal 15. The voltage $E_x$ to be measured is applied across terminal 15 and ground.

An electronic switching circuit is provided to discharge the condenser 12 when the latter has been charged to a predetermined level which is considerably below the level of the voltage $E_x$. The latter comprises a bi-stable flip-flop trigger circuit including a duotriode tube 16 preferably of the 12AU7 type. The cathodes of this tube are connected to ground through a common cathode resistor 17 of 15,000 ohms, while the anodes are connected to a plus 250 volt anode supply circuit 18 through respective resistors 19 and 20 of 47,000 ohms each.

The grid of the right-hand triode is normally biased above cut-off so as to normally hold this triode in conducting condition by a voltage divider network including resistors 21 and 22 of 68,000 ohms and 100,000 ohms, respectively, connected between the anode of the left-hand triode and ground. Resistors 21 and 22 are connected at their juncture to the grid of the right-hand triode and a condenser 23 of 300 mmfd. is connected across the resistor 22. The left-hand triode of tube 16 is normally nonconducting, but as the condenser 12 is being charged by the unknown voltage $E_x$, the grid potential of this tube rises until conduction occurs. The resultant drop in its anode voltage is applied as a negative pulse over line 24 and resistor 22 to lower the grid potential of the right-hand triode of tube 16, causing the latter to become nonconducting.

A second duotriode tube 25 is provided, the left-hand triode 25a thereof forming a clamp section. The cathode of the latter triode section 25a is connected directly to ground line 13 while the anode thereof is connected through line 26 to the upper or high potential end of condenser 12 and to the grid of the left-hand triode of tube 16. Triode 25a is normally biased to nonconducting condition by a minus 105 volt bias line 27 connected to the grid thereof through a 470,000 ohm resistor 28.

As the right-hand triode of tube 16 becomes nonconducting in response to the charge on the condenser 12 reaching its critical level, a positive pulse is applied over a line 30, through a 470,000 ohm resistor 31, to the grid of the triode 25a, causing the same to conduct and thus provide a discharge path through line 26 for the condenser 12. As the charge in condenser 12 approaches zero, the condition of the tube 16 will be reversed to its original status and the condenser will immediately commence recharging at a rate dependent upon the instantaneous value of the voltage $E_x$.

A third tube 32 of the 12AU7 type comprises a second, mono-stable, flip-flop trigger circuit forming a pulse shaper for pulses resulting from operation of the tube 16. The cathodes of the latter tube are connected to the ground line 13 through a common cathode resistor 33 of 4700 ohms, while the anodes of the left and right-hand triodes of this tube are connected to the anode supply line 18 through resistors 34 and 35 of 100,000 and 10,000 ohms, respectively.

It will be noted that the grid of the left-hand triode of tube 32 is connected directly to the ground line 13, thereby maintaining this section normally nonconducting. However, as the aforementioned negative pulse is transmitted over line 24, in response to charge of the condenser 12, such pulse will be differentiated by a condenser 36 and the resultant pulse will be applied through a 400 mmfd. condenser 37 to the grid of the right-hand triode of tube 32, causing the latter to become momentarily nonconducting, and the left-hand section conducting. The tube 32 will return to its previous condition after a time determined by the RC constant of condenser 37 and a grid-cathode resistor 38 of 470,000 ohms.

The rise in voltage resulting from the momentary blocking of the right-hand triode of tube 32 is applied through line 40 to the grid of the normally nonconducting right-hand triode of tube 25, thus causing this tube to conduct. The latter is connected as a cathode follower to a frequency output line 41 connected to the cathode of this triode ahead of a cathode resistor 42 of 27,000 ohms.

It will appear from the foregoing that a pulse frequency will be transmitted over line 41 which is directly proportional to the value of the instantaneous voltage $E_x$ and this frequency will continually vary directly in proportion to the variation of the applied voltage.

A time base circuit, generally indicated at 42, is provided to sample the frequency transmitted over line 41 for a fixed period of time so as to register a digital count on an electronic counter 43 indicative of the instantaneous value of the voltage being measured.

Although any of many different forms of time base circuits may be employed, the present time base circuit includes a flip-flop trigger circuit including a 12AU7 type tube 44. The latter is connected as a mono-stable multivibrator. The cathodes of tube 44 are connected through a common cathode resistor 45 of 4700 ohms to a ground line 46, while the anodes are connected to the plus 250 volt anode supply line 18 through resistors 47 and 48 of 47,000 ohms and 27,000 ohms, respectively. The grid of the left-hand triode of tube 44 is directly connected to ground line 46, thereby holding the same in nonconducting condition. On the other hand, the grid of the right-hand triode is coupled to its cathode through a grid bias rheostat 50, normally holding this triode in conducting condition.

When it is desired to register the value of the voltage $E_x$, a normally open switch 51, connected in series with a minus 70 volt supply line 52 and a one megohm resistor 53 to ground, is momentarily closed, applying a negative pulse through coupling capacitor 54 to the anode of the left-hand triode of tube 44 and also through condenser 55 to the grid of the right-hand triode. Thus, application of this negative pulse will reverse the condition of tube 44, causing the right-hand triode to become nonconducting and the left-hand triode conducting.

The tube 44 will eventually return to its initial condition wherein the right-hand side conducts after a period of time dependent upon the RC values of condenser 55 and rheostat 50. Such time may be varied as desired by adjusting the value of the rheostat.

The tube 44 controls a gate tube 56 of the 6AS6 type. The cathode of the latter is connected directly to the ground line 46 and the anode thereof is connected to the plus 250 volt anode supply line 18 through a resistor 57 of 100,000 ohms. The lower control grid of the latter tube 56 is normally held below cut-off potential by the minus 105 volt bias line 27 connected thereto through a resistor 59 of 470,000 ohms. However, during the gating period, i. e., when the condition of tube 44 is reversed to maintain the right-hand triode thereof nonconducting, the increase in anode potential as applied to the lower control grid through resistor 60, will overcome the negative bias, raising the lower control grid above cut-off.

Likewise, the upper control grid of tube 56 is normally biased below cut-off potential by the negative bias supply line 27 through a resistor 160. The upper control grid is connected to the frequency output line 41 of the aforementioned variable frequency oscillator section through a resistor 61. Thus, when the tube control grids of tube 56 are coincidentally rendered positive, i. e., during a gating interval, and when a positive pulse is being transmitted by the oscillator, the tube 56 will conduct. The resultant drop in potential of the anode of tube 56 will transmit a negative pulse over line 62 and coupling condenser 63 of .01 mfd. to the grid of the left-hand triode section of a 12AU7 tube 64. The latter triode is normally held in conducting condition by a grid bias resistor 164 connected between the condenser 63 and ground line 46. The cathode of the latter triode is connected directly to ground while the anode thereof is directly connected to the resistor 65 of 100,000 ohms to the anode supply line 18. In response to the negative pulse transmitted to its grid, the left-hand triode of tube 64 will be rendered nonconducting, causing a positive pulse to be transmitted over line 66 to the grid of the right-hand triode of this tube. The latter triode is connected as a cathode follower to the electronic counter 43, and as this triode conducts, the cathode potential thereof will rise to enter a count pulse into the counter. Such count pulses will be in time with the pulses emitted over line 41 during such period of time that the gating circuit 42 is opened.

In lieu of the counter 43, the output of the gating circuit may be used to actuate other forms of indicating or controlling equipment.

Having thus described the invention, what I desire to secure by United States Letters Patent is:

1. A voltage measuring system comprising the combination of a gate circuit, input and output circuits for said gate circuit, a pulse registering device connected to said output circuit, means for controlling said gate circuit to remain open for a predetermined length of time, an electrical impedance device, a condenser connected in series with said impedance device, means for applying a voltage to be measured across said impedance device and said condenser, a variable resistance device having one terminal connected to the side of said condenser opposite said impedance device, said resistance device having another terminal connected to the side of said condenser adjacent said impedance device, a control element for varying the resistance of said resistance device, means normally biasing said control element to cause said resistance device to present a relatively large resistance whereby to prevent discharge of said condenser, a flip-flop circuit alternatively adjustable between two conditions, means normally biasing said flip-flop circuit into a first one of said conditions thereof, means responsive to accumulation of a charge of a predetermined voltage across said condenser for biasing said flip-flop circuit into the second one of said conditions thereof, and means controlled by said flip-flop circuit upon said change thereof from said first to said second condition for applying a pulse to said input circuit and for activating said control element to cause said resistance device to present a relatively low resistance whereby to discharge said condenser.

2. A voltage measuring system comprising the combination of a gate circuit, input and output circuits for said gate circuit, a pulse registering device connected to said output circuit, means for controlling said gate circuit to remain open for a predetermined length of time, a resistor, a condenser connected in series with said resistor, means for applying a voltage to be measured across said resistor and said condenser, an electron tube comprising a cathode, an anode and a control electrode; said cathode being connected to the side of said condenser opposite said resistor, said anode being connected to the side of said condenser adjacent said resistor, means normally biasing said control electrode to render said tube nonconductive, a flip-flop circuit alternatively adjustable between two conditions, means normally biasing said flip-flop circuit into a first one of said conditions thereof, means responsive to accumulation of a charge of a predetermined voltage across said condenser for biasing said flip-flop circuit into the second one of said conditions thereof, and means controlled by said flip-flop circuit upon said change thereof from said first to said second condition for applying a pulse to said input circuit and for raising the potential of said control electrode to cause conduction of said tube whereby to discharge said condenser.

References Cited in the file of this patent

UNITED STATES PATENTS

| | | |
|---|---|---|
| 2,407,320 | Miller | Sept. 10, 1946 |
| 2,418,425 | Poch | Apr. 1, 1947 |
| 2,516,189 | Dinsmore | July 25, 1950 |
| 2,616,965 | Hoeppner | Nov. 4, 1952 |
| 2,627,031 | Moore | Jan. 27, 1953 |
| 2,651,204 | Dickinson | Sept. 8, 1953 |
| 2,672,284 | Dickinson | Mar. 16, 1954 |
| 2,767,378 | Hass | Oct. 16, 1956 |